(12) United States Patent
Thurimella

(10) Patent No.: US 10,710,457 B2
(45) Date of Patent: Jul. 14, 2020

(54) GESTURE AND FACIAL EXPRESSIONS CONTROL FOR A VEHICLE

(71) Applicant: AUDI AG, Ingolstadt (DE)

(72) Inventor: Anil Thurimella, München (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/137,073

(22) Filed: Sep. 20, 2018

(65) Prior Publication Data

US 2019/0092169 A1 Mar. 28, 2019

(30) Foreign Application Priority Data

Sep. 22, 2017 (DE) .......................... 10 2017 216 837

(51) Int. Cl.
| | | |
|---|---|---|
| *G06K 9/00* | (2006.01) | |
| *B60K 35/00* | (2006.01) | |
| *B60K 37/06* | (2006.01) | |
| *G06F 3/01* | (2006.01) | |

(52) U.S. Cl.
CPC .............. *B60K 35/00* (2013.01); *B60K 37/06* (2013.01); *G06F 3/011* (2013.01); *G06F 3/017* (2013.01); *G06K 9/00302* (2013.01); *G06K 9/00335* (2013.01); *G06K 9/00355* (2013.01); *G06K 9/00845* (2013.01); *B60K 2370/1464* (2019.05); *B60K 2370/21* (2019.05)

(58) Field of Classification Search
None
See application file for complete search history.

(56) References Cited

U.S. PATENT DOCUMENTS

| | | | |
|---|---|---|---|
| 2011/0235919 A1 | 9/2011 | Morita et al. | |
| 2011/0304541 A1* | 12/2011 | Dalal | G06F 3/017 |
| | | | 345/158 |
| 2013/0066526 A1 | 3/2013 | Mondragon et al. | |
| 2013/0204457 A1 | 8/2013 | King et al. | |
| 2015/0053066 A1 | 2/2015 | Hampiholi et al. | |
| 2016/0104486 A1* | 4/2016 | Penilla | H04L 67/12 |
| | | | 704/232 |
| 2017/0247000 A1* | 8/2017 | Ricci | G06K 9/00302 |

FOREIGN PATENT DOCUMENTS

| | | |
|---|---|---|
| DE | 102014218457 A1 | 3/2016 |
| DE | 102015011522 A1 | 5/2016 |
| DE | 102015008448 A1 | 1/2017 |

(Continued)

OTHER PUBLICATIONS

English-language abstract of German Patent Application Publication No. DE 102014218457 A1, published Mar. 17, 2016; 5 pages.

(Continued)

*Primary Examiner* — Tamara L Weber
(74) *Attorney, Agent, or Firm* — Sterne, Kessler, Goldstein & Fox P.L.L.C.

(57) ABSTRACT

The present approach relates to a vehicle having a plurality of devices and a human-machine interface (HMI) for the gesture- and/or facial expression-based actuation of a function of a vehicle device, which comprises a camera for recording a specific occupant of a vehicle and a control unit connected to the camera.

11 Claims, 2 Drawing Sheets

(56) References Cited

FOREIGN PATENT DOCUMENTS

DE    102015221607 A1    5/2017

OTHER PUBLICATIONS

English-language abstract of German Patent Application Publication No. DE 102015011522 A1, published May 12, 2016; 5 pages.
English-language abstract of German Patent Application Publication No. DE 102015008448 A1, published Jan. 5, 2017; 5 pages.
English-language abstract of German Patent Application Publication No. DE 102015221607 A1, published May 4, 2017; 5 pages.

* cited by examiner

GESTURE AND FACIAL EXPRESSIONS CONTROL FOR A VEHICLE

TECHNICAL FIELD

The present disclosure relates to a vehicle with a plurality of devices and a human-machine interface (HMI) for the facial expression- and/or gesture-based actuation of a function of a vehicle device, which comprises a camera for detecting a certain occupant of the vehicle and a control unit connected to the camera. Furthermore, the present disclosure also relates to a method for actuating a function of a vehicle device by means of a facial expression and a gesture of a specific vehicle occupant.

BACKGROUND

Modern vehicles typically have a plurality of different functions, some of which go far beyond simply controlling the vehicle. Accordingly, vehicles are being developed with the objective to allow particularly the driver of a vehicle to actuate and monitor all provided vehicle functions in the simplest manner possible. To do so, the individual vehicle functions are generally made accessible to the driver via one or more human-machine interfaces.

Thus, every human-machine interface allows a mostly bidirectional interaction of the driver or other occupants of the vehicle with the vehicle, and in its simplest form, it may comprise for example a lever, a rotating knob, a toggle switch, a push button or a pedal as well as an analog or digital display, an indicator light or a warning light.

Increasingly, vehicles are being equipped with so-called driver-assistance systems, which assist and/or take a load off the driver in controlling a vehicle and thereby decrease the risk of an accident for the vehicle or increase the safety of the vehicle occupants. For example to assist the driver when parking the vehicle, parking assistance systems are available, which include simple distance sensors with a warning function, reverse area cameras with a conveniently observable monitor, or fully automatic parking assistants, which can automatically reverse and park a vehicle without the intervention of the driver.

Other examples of advanced driver assistance systems are represented by so-called brake assistants, which monitor the space in front of a moving vehicle and automatically brake the vehicle when the distance of the vehicle to a vehicle ahead, other road users, such as cyclists or pedestrians, or some other obstacle decreases below a certain value depending on the speed of the vehicle.

Many vehicle traffic accidents are attributed to the inattentiveness of the respective drivers. A driver's inattentiveness may be the result of a distraction, a lack of concentration, fatigue or momentarily nodding off. A driver assistance system for detecting inattentiveness of the driver requires a corresponding highly specialized human-machine interface.

For example, DE 10 2015 011 522 A1 discloses a driver assistance device for a vehicle, which comprises an image acquisition device having a camera integrated in the steering wheel of the vehicle. The camera is essentially oriented toward the head of the driver to detect parameters relevant to driver inattentiveness or fatigue, such as an eye blink, an eyelid closing, a viewing angle, a head tilt and/or head motion of the driver. Upon detecting inattentiveness or fatigue of the driver, a corresponding warning can be triggered.

From US 2011/0235919 A1 a similar device is known, which comprises a camera for detecting open/closed eyes and a control unit, and which can be used in a vehicle to determine the momentary nodding off of the driver. Besides analyzing the degree of openness of the eyes, the device also analyzes the entire facial expression of the driver so as to avoid incorrectly detecting the state of momentary nodding off when the driver has facial expressions, which have closed or almost closed eyes while in an awake state.

In comparison, driver assistance systems are also known, which are primarily intended to make actuation of vehicle functions per se more uniform and intuitive, as well as to permit actuation by at least some additional vehicle occupants besides the driver. For example, convenient operation of an entertainment system, such as a radio or music system installed in the vehicle, could be made possible for the other vehicle occupants by means of a corresponding assistance system. Such vehicle assistance systems naturally require correspondingly complex human-machine interface designs.

DE 10 2014 218 457 A1 discloses a transportable memory device with a processor for connecting to a data interface of a sensor of a driver assistance system of a vehicle. The storage unit can be connected to various sensors of the driver assistance system and comprises, for the purpose of interacting with vehicle occupants, a human-machine interface, which has a camera for visually monitoring a vehicle interior, a light source for illuminating the vehicle interior or for emitting light signals, a microphone for acoustically monitoring the vehicle interior, a loudspeaker for emitting acoustic signals and/or a radar sensor for detecting vehicle occupants in the vehicle interior in times of darkness. The camera enables one to detect the gestures or facial expressions of a specific vehicle occupant to determine a vehicle function to be actuated. To do so, gesture- or facial expression-detection must be activated by the specific vehicle occupant via a voice command. If the transportable memory device is integrated in the key of a vehicle, it can also be provided that starting the vehicle is first allowed after successful authentication of the driver by means of voice recognition and/or facial recognition.

However, it has not been possible to date for various vehicle occupants, i.e., the driver and at least the front passenger or another passenger, to interact simultaneously or in a time-overlapping manner with the vehicle via a shared human-machine interface.

Therefore, the object of the present disclosure is to provide a vehicle having an improved human-machine interface, which avoids the described disadvantages and allows for a simultaneous or time-overlapping interaction of various vehicle occupants with the vehicle. In addition, an object of the present disclosure is to provide a method for the simultaneous or time-overlapping actuation of vehicle functions by various vehicle occupants.

SUMMARY

A subject matter of the present disclosure is a vehicle having a plurality of functional devices and a human-machine interface (HMI) for the facial expression- and gesture-based actuation of a function of a vehicle device. The human-machine interface comprises a camera for recording a certain occupant of the vehicle and a control unit connected to the camera.

In one embodiment, the control unit is configured to extract a facial expression and hand motion of the occupant from image sequences of the occupant captured by the camera, and to combine the extracted facial expression and the extracted hand motion of a specific occupant to determine a vehicle function to be actuated. If the vehicle already has a camera for recording a vehicle interior and a control unit, only the installation of special software modules in the control unit of the vehicle is required to create a vehicle according to the present disclosure. The software modules may comprise an image processing module, an actuation module, and a learning module (machine learning engine), which interact via respective corresponding interfaces. In addition, the control unit may contain data memories, which the learning module can access in a reading and/or writing mode.

Compared to facial expressions or gestures per se, a combination of facial expressions and gestures expands the expression possibilities of the occupant and allows for a greater differentiation level and lower error rate when interacting with the vehicle devices. In particular, the human-machine interface according to embodiments of the present disclosure may also be suited for the hearing impaired. The differentiated expression possibilities of their sign language are based on a combination of facially expressed and gestural comments.

In addition, multiple occupants of a vehicle can be readily differentiated by means of a combination of facial expressions and gestures to ensure an uninterrupted interaction of a specific occupant, such as the driver, with the vehicle even when additional vehicle occupants interact simultaneously or in a time-overlapping manner with the vehicle through gestures.

In one embodiment, the human-machine interface is configured to recognize the occupant by means of the facial expression of the occupant and to detect a device function to be actuated using the facial expression and/or hand motion of the occupant. Facial expressions are particularly well suited for authenticating, i.e., identifying, a specific occupant while hand motions allow for an intuitive functional interaction with the vehicle. The functional interaction with the vehicle can thereby be further differentiated and improved by combining facial expressions and hand motions.

In one embodiment, the human-machine interface comprises a data memory for storing an interaction profile of a specific occupant, which comprises a plurality of allocations of a recognized facial expression combined with a recognized hand motion respectively of the occupant to a device function. By means of a data memory, a learning function of the human-machine interface can be executed. During the interaction of the specific occupant with the vehicle, the human-machine interface stores the typical facial expressions and hand motions of the specific occupant in the data memory. Based on the stored facial expression and gesture data, one can significantly decrease the risk of control errors by the specific occupant. Combined facial expression and gesture data of every vehicle occupant can be consolidated together with the device functions to be actuated into an individual interaction profile. The specific occupant is thereby free to make a facial expression and/or hand motion with which he/she wishes to actuate a certain function of a certain vehicle device.

In an embodiment, the vehicle has connected to the control unit a communications unit, which is designed for wireless communications with a server (automotive back-end) arranged outside the vehicle, in order to load a vehicle occupant interaction profile saved in a data memory, or to save an interaction profile of a vehicle occupant, particularly with his/her consent, in the data memory of the server. In other words, a vehicle occupant, who uses various vehicles, is not required to retrain every human-machine interface for learning individual peculiarities of his/her facial or gestural expressions. As a result, a vehicle occupant can easily access his/her interaction profile generated by training the human-machine interface, for example, from all vehicles of a vehicle fleet. In larger companies as well as within the scope of car sharing, this may be a benefit. A server within the meaning of the present disclosure is also a computer center, a distributed computer center, a cloud or a computer cluster.

In one embodiment of the human-machine interface, a specific occupant is the driver of the vehicle and/or a passenger in the vehicle. Controlling conventional vehicles requires that the driver interact extensively with the vehicle. In such vehicles, the driver thus benefits the most from the human-machine interface according to the present disclosure. However, the human-machine interface allows the front passenger or an additional passenger in the vehicle to actuate vehicle entertainment devices, while the driver simultaneously actuates safety-based vehicle devices. Vehicles with a highly automated or fully automatic self-driving function decrease the interaction requirement for the driver so that in such vehicles, the interaction of other vehicle occupants becomes more important relative to the driver interaction.

Other embodiments of the present disclosure are directed to a method for the facial expression- and gesture-based actuation of a device function of a vehicle by a specific vehicle occupant, particularly by means of a human-machine interface according to the present disclosure.

In the method according to embodiments of the present disclosure, image sequences of a particular occupant are continually recorded in real time using a camera. In addition, the camera captures an interior of the vehicle, in which the driver and other occupants of the vehicle, if applicable, are located. The recorded image sequences are analyzed and facial expressions and hand motions of a specific occupant are extracted separately in each case from the real-time images by means of the software modules installed in the vehicle. The facial expressions and hand motions recorded in the real-time images are allocated to the vehicle occupants based on the relative spatial arrangement in the real-time images.

According to embodiments of the present disclosure, the extracted facial expressions and hand motions of the occupant are combined to determine the vehicle function to be actuated. Combining facial and gestural expressions can decrease the risk of a misactation. Besides that, in a combination, facial and gestural expressions of various vehicle occupants can be readily distinguished.

Then the determined vehicle function is actuated. In other words, the human-machine interface interprets a combination of a recognized facial expression and a recognized hand motion of a particular vehicle occupant as a command to the vehicle and automatically actuates a corresponding function of a vehicle device.

In one embodiment of the method, the occupant is recognized by the facial expression and the vehicle function to be actuated is recognized by means of the hand motion of the occupant. Facial expressions are particularly well suited for authenticating, i.e., identifying, a specific occupant, while hand motions allow a specific occupant to intuitively and functionally interact with the vehicle and actually address the vehicle function to be actuated. However, different weightings of facial expressions and hand motions also remain within the protected scope of the present disclosure.

In an embodiment of the method, the separate extraction of the facial expressions and hand motions occurs based on visible and spatially separate skin regions, corresponding to a face and a hand, of the occupant. Visible skin regions can generally be readily differentiated from clothed body parts due to their color. Generally, the face and hands represent the only visible skin regions of a vehicle occupant, while other body regions are covered by clothing. Accordingly, color contrasts between skin and clothing can be used for detecting and extracting a facial expression and a hand.

In another embodiment of the method, the facial expressions are determined by means of a facial recognition algorithm and/or the hand motions are determined by means of a gesture recognition algorithm. Such algorithms for recognizing a facial expression and/or a gesture may be comprised in a software module and can determine and match facial proportions or expressions and/or hand positions or motions from the real-time images.

In one embodiment of the method, the facial expressions and hand motions of the occupant are processed by means of an algorithm for machine learning to better recognize a particular occupant using facial expressions and/or hand motions. Such an algorithm may be comprised in software modules. By means of machine learning, the facial and gestural expressions of an occupant can be reliably determined despite an unavoidable natural variability and a vehicle occupant can be reliably identified by means of the recognized facial and gestural expressions.

In one embodiment of the method, a plurality of allocations of an occupant's recognized facial expression combined with a recognized hand motion respectively to a function of a device of the vehicle is consolidated in an interaction profile. Such an interaction profile is allocated to a specific occupant and comprises typical facial expressions and hand motions of the specific occupant as well as device functions to be actuated with them.

In an additional embodiment of the method, after approval by the specific occupant by means of a communications unit provided in the vehicle, the interaction profile is saved in a data memory arranged outside of the vehicle and/or loaded from a data memory arranged outside of the vehicle. When the interaction profile is saved outside of the vehicle, it may be used by the specific occupant in various vehicles. Repeated training of the human-machine interface in each of the various vehicles can thereby be omitted. The interaction profile can also store other data of the specific occupant, if applicable, for use in various vehicles. In other words, this embodiment creates an occupant-centered method for actuating vehicle functions, which, for fleets of vehicles for example that are jointly used by multiple employees of a company, is an advantage compared to a vehicle-centered method.

BRIEF DESCRIPTION OF THE DRAWINGS

Other advantages, features and details of the present disclosure result from the claims, the description of embodiments below, and the drawings, in which:

DETAILED DESCRIPTION

Figure 1:
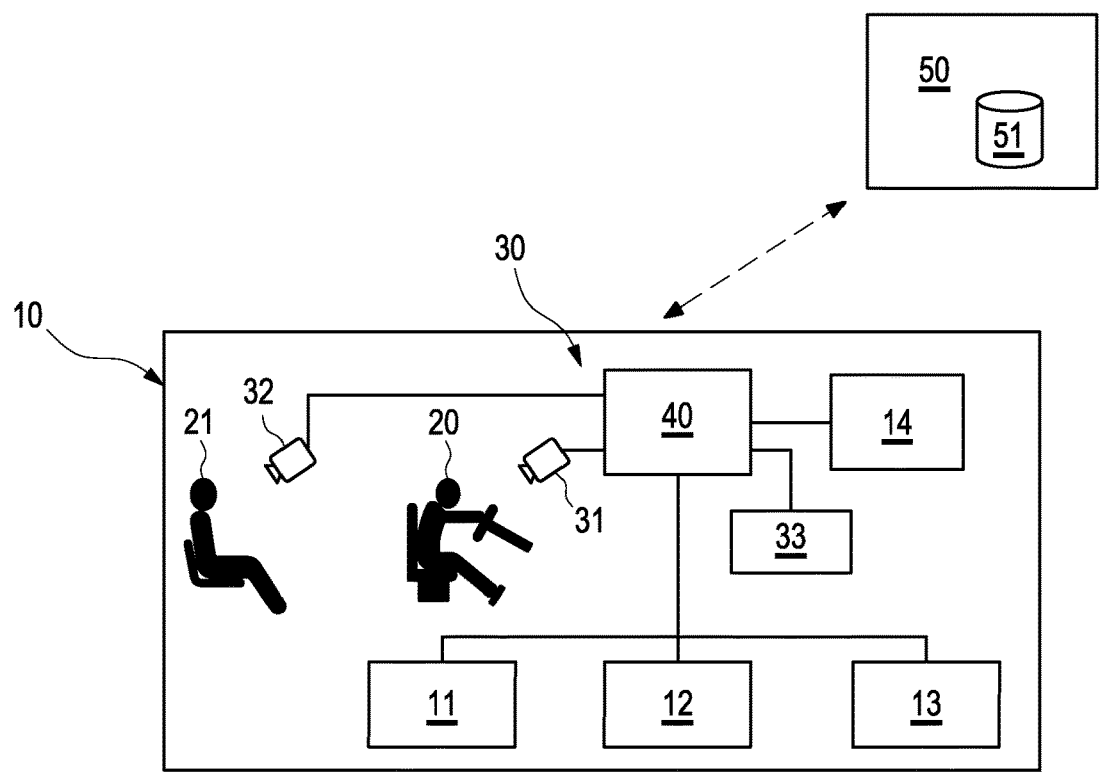
FIG. 1 depicts a schematic view of an embodiment of a vehicle according to embodiments of the present disclosure

FIG. 1 shows in a schematic view an embodiment of a vehicle 10 according to embodiments of the present disclosure. Vehicle 10 comprises a plurality of devices 11, 12, 13, of which only three are shown for the sake of clarity. Devices 11, 12, 13 may be vehicle lighting, a windshield wiper system, an air-conditioning system, a navigation device, an entertainment device or similar.

Furthermore, vehicle 10 has a human-machine interface (HMI) 30. Human-machine interface 30 comprises two cameras 31, 32, which are directed at the vehicle interior, to record specific occupants 20, 21 of vehicle 10. The depicted specific occupants 20, 21 pertain to driver 20 of vehicle 10 and a passenger 21, for example the front passenger in vehicle 10. However, human-machine interface 30 can also be designed in such a manner that it captures only driver 20, only a particular passenger 21 or also additionally other non-depicted passengers. Furthermore, human-machine interface 30 comprises a display unit 33, which shows the operating status of devices 11, 12, 13 to specific occupants 20, 21.

Human-machine interface 30 also comprises a control unit 40. Control unit 40 is connected to cameras 31, 32 and display unit 33, and is configured to also allow specific occupants 20, 21 a facial expression- and/or gesture-based actuation of functions of devices 11, 12, 13.

Vehicle 10 also has a communications unit 14 connected to control unit 40. Communications unit 14 is designed for wirelessly communicating with a server 50 (automotive backend) in order to store data on a data memory 51 of server 50 or to load data from a data memory 51 of server 50. Server 50 is arranged outside of vehicle 10 and can be arranged for example centrally at the location of the manufacturer of vehicle 10 or in a headquarters of a company having a fleet of vehicles 10.

Figure 2:
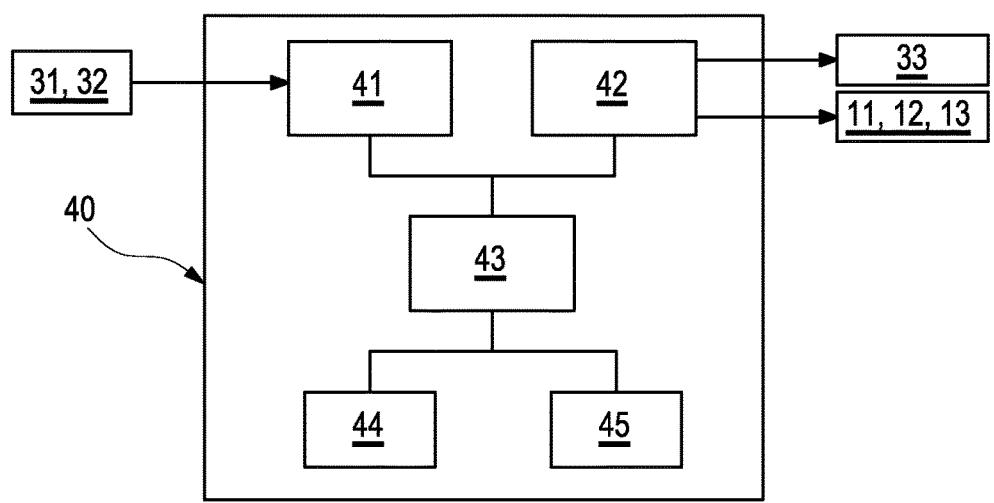
FIG. 2 depicts a block diagram of an embodiment of a control unit of a vehicle according to embodiments of the present disclosure.

FIG. 2 depicts a block diagram of an embodiment of a control unit 40 of a vehicle 10 according to embodiments of the present disclosure. An image processing module 41 is installed in control unit 40. Image processing module 41 comprises a facial expression recognition algorithm and a gesture recognition algorithm, and is configured to extract a facial expression and a hand motion of occupant 20, 21 from image sequences recorded by cameras 31, 32 based on visible and spatially separated skin regions, corresponding to a face and a hand, of a specific occupant 20, 21.

An actuation module 42 is also installed in control unit 40. From a combination of an extracted facial expression and an extracted hand motion, actuation module 42 is configured to determine a function to be actuated of a device 11, 12, 13, to actuate the function of device 11, 12, 13, and to indicate the operating status of the actuated device 11, 12, 13 on display unit 33.

Furthermore, a learning module 43 (machine learning engine) is installed in control unit 40. Learning module 43 comprises an algorithm for machine learning and is configured to recognize, learn and allocate to a specific occupant 20, 21 extracted facial expressions and extracted hand motions. The combination of a recognized facial expression with a recognized hand motion of a specific occupant 20, 21 is used for determining in a differentiated and reliable manner a desired function, to be actuated by occupant 20, 21, of a device 11, 12, 13 of vehicle 10. Learning module 43 thereby recognizes a specific occupant 20, 21 by means of the facial expression, while it recognizes a function to be actuated of a device 11, 12, 13 of vehicle 10 by the facial expression and hand motion of occupant 20, 21.

Furthermore, control unit 40 comprises a first data memory 44, which is configured for storing and/or reading an interaction profile of a specific occupant 20, 21. An interaction profile of an occupant 20, 21 comprises a plurality of allocations of a recognized facial expression combined with a recognized hand motion of occupant 20, 21 to a function of a device 11, 12, 13 of vehicle 10. Learning module 43 can access first data memory 44 to enter into it stored interaction profiles of occupants 20, 21 of vehicle 10 and update them. Alternatively or additionally, interaction profiles loaded in first data memory 44 from data memory 51 of server 50 can be stored and updated locally.

Control unit 40 also comprises a second data memory 45, which is configured to provide learning module 43 with reference data pertaining to facial expressions and hand motions. The reference data stems from a large number of persons and forms a database for comparison purposes. Based on the reference data of second data memory 45, the recognition of extracted facial expressions and hand motions is simplified for learning module 43.

Figure 3:
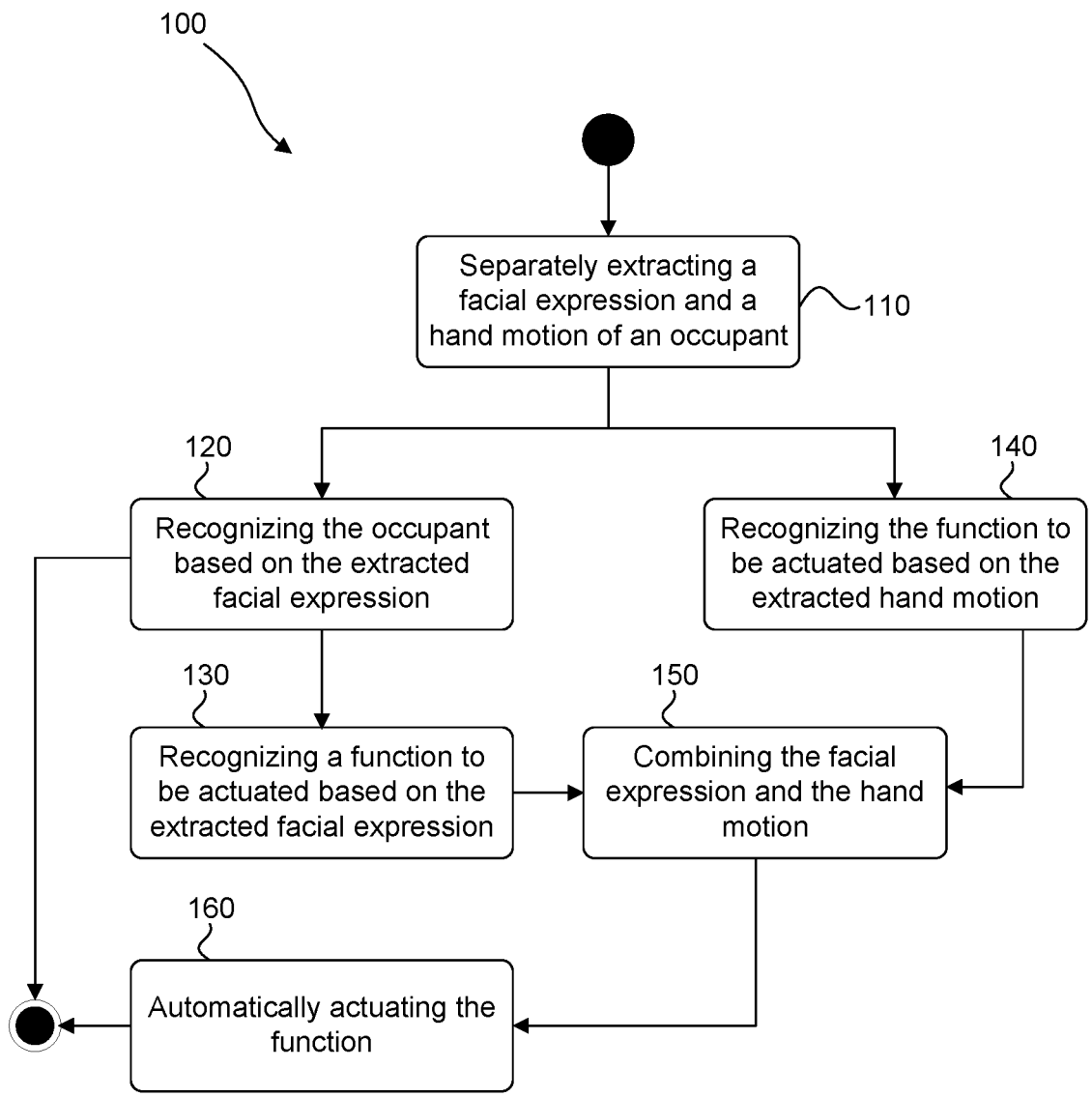
FIG. 3 depicts a flow diagram of an embodiment of a method according to embodiments of the present disclosure.

FIG. 3 depicts a flow diagram of an embodiment of a method 100 according to embodiments of the present disclosure. While human-machine interface 30 is operating, image sequences of specific occupants 20, 21 are continually recorded in real time by means of cameras 31, 32. The recorded image sequences are analyzed by image processing module 41 continuously. Following the analysis, facial expressions and hand motions of specific occupant 20, 21 are each separately extracted 110 from the real-time images.

The separate extracting 110 of a facial expression and a hand motion occurs based on visible and spatially separate skin regions, corresponding to a face and a hand, of respective occupant 20, 21. In doing so, the facial expression is extracted by means of the facial expression recognition algorithm comprised in image processing module 41 and the hand motion is extracted by means of the gesture recognition algorithm comprised in image processing module 41.

Specific occupant 20, 21 is recognized 120 by means of the extracted facial expression. In each case, a function to be actuated of a device 11, 12, 13 is first recognized independently 130 by means of the extracted facial expression and recognized 140 by means of the extracted hand motion. For a more differentiated and/or more reliable recognition of a function to be actuated of a device 11, 12, 13, the recognized facial expression and the recognized hand motion are then combined 150. Thereupon, the function of device 11, 12, 13, desired by occupant 20, 21 is automatically actuated 160.

The facial expressions and hand motions of occupant 20, 21 are processed by means of the machine learning algorithm implemented in learning module 43. As a result, human-machine interface 30 is able to learn facial expressions and/or hand motions of a specific occupant 20, 21, to recognize, with increasing reliability after corresponding training, the function to be actuated of a device 11, 12, 13 of vehicle 10, and thereby to tolerate an unavoidable natural variability of the facial expressions and gestures of occupant 20, 21.

A plurality of allocations respectively of a recognized facial expression combined with a recognized hand motion of specific occupant 20, 21 to a function of a device 11, 12, 13 of vehicle 10 is consolidated into an interaction profile of occupant 20, 21 and stored in first data memory 44 of control unit 40.

After the approval of each specific occupant 20, 21, an interaction profile from first data memory 44 can be stored by means of communications unit 14 in data memory 51 of server 50 or can be loaded from data memory 51 of server 50 into first data memory 44.

Human-machine interface 30 according to the present disclosure offers occupants 20, 21 of a vehicle 10 an entirely new interactive experience, whereby it allows them from their respective seat positions in vehicle 10 to interact with devices 11, 12, 13 of vehicle 10 in a particularly convenient, intuitive and reliable manner. In addition to driver 20, passengers 21 can also actuate certain devices 11, 12, 13 of vehicle 10 in a facial expression- or gesture-based manner—simultaneously or in a time-overlapping manner. The combination of facial expression- and gesture-based control misallocations of occupants 20, 21 on the one hand and functions to be actuated of devices 11, 12, 13 on the other can be significantly reduced or even completely excluded.

The invention claimed is:

1. A vehicle comprising:
   a plurality of devices; and
   a human-machine interface for a facial expression-based and/or gesture-based actuation of the plurality of devices, wherein the human-machine interface comprises:
   a first camera for recording a first occupant of the vehicle,
   a second camera for recording a second occupant of the vehicle, and
   a control unit connected to the first and second cameras, the control unit configured to extract a first facial expression and a first hand motion performed by the first occupant from image sequences captured by the first camera and to combine the extracted first facial expression and the extracted first hand motion of the first occupant to determine a first function to be actuated by a first device of the plurality of devices, the control unit further configured to extract a second facial expression and a second hand motion performed by the second occupant from image sequences captured by the second camera and to combine the extracted second facial expression and the extracted second hand motion of the second occupant to determine a second function to be actuated by a second device of the plurality of devices, the control unit further configured to actuate the first and second functions simultaneously.

2. The vehicle according to claim 1, wherein the human-machine interface is configured to recognize the first occupant by means of the first facial expression performed by the first occupant and to determine the first function to be actuated by means of at least one of the first facial expression or the first hand motion performed by the first occupant.

3. The vehicle according to claim 1, wherein the human-machine interface comprises a data memory for storing interaction profiles of occupants of the vehicle, the interaction profiles comprising a plurality of mappings of a recognized facial expression combined with a recognized hand motion performed by the occupants respectively to the function of one or more of the plurality of devices.

4. The vehicle according to claim 3, further comprising:
   a communications unit connected to the control unit, the communications unit configured to wirelessly communicate with a server arranged outside of the vehicle to load an interaction profile of an occupant stored in a data memory of the server into the control unit, or to store an interaction profile of an occupant of the vehicle in the data memory of the server.

5. The vehicle according to claim 1, wherein the first occupant is a driver of the vehicle or a passenger in the vehicle.

6. A method for facial expression-based and gesture-based actuation of a function of a plurality of devices of a vehicle, the method comprising:
   recording, by a first camera associated with the vehicle, first image sequences of a first occupant of the vehicle, the first image sequences being recorded continuously in real time;

recording, by a second camera associated with the vehicle, second image sequences of a second occupant of the vehicle, the second image sequences being recorded continuously in real time;

analyzing, by a control unit associated with the vehicle, the recorded first and second image sequences;

extracting, by the control unit, a first facial expression and a first hand motion of the first occupant from the first image sequences based at least in part on the analyzing, the first facial expression and the first hand motion extracted separately;

extracting, by the control unit, a second facial expression and a second hand motion of the second occupant from the second image sequences based at least in part on the analyzing, the second facial expression and the second hand motion extracted separately;

(i) combining, by the control unit, the first extracted facial expression and the first hand motion;

(ii) combining, by the control unit, the second extracted facial expression and the second hand motion;

determining, by the control unit, a first function of a first device to be actuated based at least in part on the combining (i);

determining, by the control unit, a second function of a second device to be actuated based at least in part on the combining (ii); and actuating, by the control unit, the first device according to the determined first function, and simultaneously actuating the second device according to the determined second function.

7. The method according to claim 6, further comprising:

identifying, by the control unit, the first occupant based at least in part on the first facial expression; and identifying, by the control unit, the first function based at least in part on at least one of the first facial expression or the first hand motion.

8. The method according to claim 6, further comprising:

identifying, by the control unit, the first and second facial expressions using a facial expression recognition algorithm; and identifying, by the control unit, the first and second hand motions using a gesture recognition algorithm;

wherein extracting the first and second facial expressions and the first and second hand motions comprises extracting the first and second facial expressions and the first and second hand motions based on visible and spatially separate skin regions, the skin regions corresponding to a face and a hand of the first and second occupants respectively.

9. The method according to claim 6, further comprising:

processing, by the control unit, the first and second facial expressions and the first and second hand motions using a learning module; and identifying, by the control unit, at least one of the first facial expression, the second facial expression, the first hand motion, or the second hand motion based at least in part on the processing.

10. The method according to claim 6, further comprising:

consolidating, by the control unit, a plurality of mappings of facial expression and hand motion combinations of the first and second occupants respectively to functions of the plurality of devices of the vehicle;

consolidating a plurality of allocations of a recognized facial expression combined with a recognized hand motion of the first and second occupants to a function of a device of the vehicle into interaction profiles associated with the first and second occupants stored by means of a communications unit provided in the vehicle in a data memory of a server arranged outside the vehicle.

11. The method according to claim 10, in which the interaction profiles are stored in the data memory and loaded out of the data memory for optional use in various different vehicles, particularly vehicles of a vehicle fleet of a company or a car-sharing pool.

* * * * *